US011414598B2

(12) United States Patent
Worsley et al.

(10) Patent No.: US 11,414,598 B2
(45) Date of Patent: Aug. 16, 2022

(54) MONOLITHIC RARE EARTH OXIDE AEROGELS

(71) Applicant: Lawrence Livermore National Security, LLC, Livermore, CA (US)

(72) Inventors: Marcus A. Worsley, Hayward, CA (US); Alexander E. Gash, Brentwood, CA (US); Robert A. Reibold, Salida, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 292 days.

(21) Appl. No.: 16/358,305

(22) Filed: Mar. 19, 2019

(65) Prior Publication Data

US 2019/0211264 A1 Jul. 11, 2019

Related U.S. Application Data

(62) Division of application No. 15/073,400, filed on Mar. 17, 2016, now Pat. No. 10,336,937.

(51) Int. Cl.
*C09K 11/77* (2006.01)
*C04B 38/00* (2006.01)
(Continued)

(52) U.S. Cl.
CPC ........ *C09K 11/7701* (2013.01); *C01F 17/212* (2020.01); *C01F 17/218* (2020.01);
(Continued)

(58) Field of Classification Search
CPC .... C09K 11/7701; C01F 17/212; C01F 17/32; C01F 17/235; C01F 17/224;
(Continued)

(56) References Cited

U.S. PATENT DOCUMENTS 10,336,937 B2 * 7/2019 Worsley ................ C01F 17/218
2002/0104599 A1 * 8/2002 Tillotson ................ C01G 43/01
149/19.92
(Continued)

FOREIGN PATENT DOCUMENTS

WO  WO-2008/077876 A1  7/2008

OTHER PUBLICATIONS

Neumann et al. Journal of Colloid and Interface Science 422 (2014) 71-78.*
(Continued)

*Primary Examiner* — Robert S Jones, Jr.
*Assistant Examiner* — Jiangtian Xu
(74) *Attorney, Agent, or Firm* — Foley & Lardner LLP

(57) ABSTRACT

Disclosed here is a method for making a monolithic rare earth oxide (REO) aerogel, comprising: preparing a reaction mixture comprising at least one rare earth metal nitrate, at least one epoxide, at least one base catalyst, and at least one organic solvent; curing the mixture to produce a wet gel; drying the wet gel to produce a dry gel; and thermally annealing the dry gel to produce the monolithic REO aerogel. Also disclosed is an REO aerogel comprising a network of REO nanostructures, wherein the REO aerogel is a monolith having at least one lateral dimension of at least 1 cm, wherein the REO aerogel has a density of about 40-500 mg/cm$^3$ and/or a BET surface area of at least about 20 m$^2$/g, and wherein the REO aerogel is substantially free of oxychloride.

18 Claims, 7 Drawing Sheets

(51) Int. Cl.

| | | |
|---|---|---|
| *C01F 17/32* | (2020.01) | |
| *C01F 17/212* | (2020.01) | |
| *C01F 17/218* | (2020.01) | |
| *C01F 17/224* | (2020.01) | |
| *C01F 17/229* | (2020.01) | |
| *C01F 17/235* | (2020.01) | |
| *C01F 17/241* | (2020.01) | |

(52) U.S. Cl.
CPC .......... *C01F 17/224* (2020.01); *C01F 17/229* (2020.01); *C01F 17/235* (2020.01); *C01F 17/241* (2020.01); *C01F 17/32* (2020.01); *C04B 38/009* (2013.01); *C01P 2002/85* (2013.01); *C01P 2004/03* (2013.01); *C01P 2004/04* (2013.01); *C01P 2006/10* (2013.01); *C01P 2006/12* (2013.01); *C01P 2006/14* (2013.01); *C01P 2006/16* (2013.01); *C01P 2006/60* (2013.01); *C01P 2006/80* (2013.01)

(58) Field of Classification Search
CPC .... C01F 17/229; C01F 17/241; C01F 17/218; C04B 38/009; C01P 2002/85; C01P 2004/03; C01P 2004/04; C01P 2006/10; C01P 2006/12; C01P 2006/14; C01P 2006/16; C01P 2006/60; C01P 2006/80
See application file for complete search history.

(56) References Cited

U.S. PATENT DOCUMENTS

| | | | | |
|---|---|---|---|---|
| 2003/0202933 | A1* | 10/2003 | Gash | .................. C01G 37/02 423/607 |
| 2003/0224924 | A1* | 12/2003 | Satcher, Jr. | .......... B01J 13/0091 501/127 |
| 2010/0267541 | A1* | 10/2010 | Satcher, Jr | ............ C04B 35/117 501/87 |
| 2011/0204244 | A1* | 8/2011 | Haard | ...................... G01T 3/06 250/369 |
| 2012/0094214 | A1 | 4/2012 | Zahid et al. | |
| 2017/0174576 | A1 | 6/2017 | Swoboda et al. | |
| 2017/0238607 | A1* | 8/2017 | Nordskog | ............. A24B 15/165 |
| 2017/0267925 | A1* | 9/2017 | Worsley | ................. C04B 38/009 |
| 2019/0211264 | A1* | 7/2019 | Worsley | ................. C01F 17/212 |

OTHER PUBLICATIONS

Zhang et al. Journal of Non-Crystalline Solids 354 (2008) 4089-4093.*
Clapsaddle et al. J. Sol. Gel. Sci. Technol (2012) 64:381-389.*
Worsley et al. Journal of Sol-Gel Science and Technology (2019) 89:176-188.*
Gash et al (J Sol-Gel Sci Technol (2012) 64:381-389) (Year: 2012).*
U.S. Office Action on U.S. Appl. No. 15/073,400 dated Aug. 6, 2018.
Clapsaddle et al., "A sol-gel methodology for the preparation of lanthanide-oxide aerogels: preparation and characterization," Journal of Sol-Gel Science and Technology, vol. 64, No. 2, 2012, pp. 381-389.
Gash et al., "Lanthanide oxide aerogels and their catalytic properties," Abstracts of Papers of the American Chemical Society, vol. 241, 2011, 1 page.
Gasser-Ramirez et al., "A simple synthesis of catalytically active, high surface area ceria aerogels," Journal of Non-Crystalline Solids, vol. 354, vol. 52-54, 2008, pp. 5509-5514.
Laberty-Robert et al., "Sol-gel-derived ceria nanoarchitectures: Synthesis, characterization, and electrical properties," Chemistry of Materials, vol. 18, No. 1, 2006, pp. 50-58.
Neumann et al., "Sol-gel preparation of alumina stabilized rare earth areo- and xerogels and their use as oxidation catalysts," Journal of Colloid and Interface Science, vol. 422, 2014, pp. 71-78.
Ramirez et al., "Preparation and Scintillating Properties of Sol-Gel Eu3 , Tb3 Co-Doped Lu2O3 Nanopowders," International Journal of Molecular Sciences, vol. 12, No. 9, 2011, pp. 6240-6254.
Shen et al., "FTIR analysis of the hydrolysis rate in the sol-gel formation of gadolinia-doped ceria with acetylacetonate precursors," Journal of Sol-Gel Science and Technology, vol. 53, No. 3, 2010, pp. 571-577.
Thundathil et al., "High surface-area ceria aerogel," Journal of the American Ceramic Society, vol. 87, No. 8, 2004, pp. 1442-1445.
Tillotson et al., "Synthesis of lanthanide and lanthanide-silicate aerogels," Journal of Sol-Gel Science and Technology , vol. 1, No. 3, 1994, pp. 241-249.
Zhang et al., "Synthesis and characterization of monolithic Gd2O3 aerogels," Journal of Non-Crystalline Solids, vol. 354, No. 34, 2008, pp. 4089-4093.
Final Office Action on U.S. Appl. No. 15/073,400 dated Jan. 18, 2019.
Notice of Allowance on U.S. Appl. No. 15/073,400 dated Mar. 14, 2019.

* cited by examiner

MONOLITHIC RARE EARTH OXIDE AEROGELS

CROSS REFERENCE TO RELATED APPLICATIONS

This application is a divisional of U.S. application Ser. No. 15/073,400, filed Mar. 17, 2016, the content of which is hereby incorporated by reference in its entirety for all purposes.

BACKGROUND

Rare earth oxides (REO) are frequently used as catalysts or catalyst supports due to their high catalytic activity, good thermal stability, and oxidation resistance. Though there have been many reports on the synthesis of high surface area REO materials, attempts to make pure, monolithic REO aerogels via the simple epoxide-assisted sol-gel method remain limited. Typically, this technique uses a metal chloride as the precursor in an ethanolic solution, which upon the addition of an organic epoxide forms a gel. Unfortunately, the use of the chloride precursor results in formation of a significant oxychloride fraction in the REO aerogels that is extremely difficult to remove (Clapsaddle et al., *J. Sol-Gel Sci. Technol.*, 2012, 64:381-389). Moreover, the presence of chlorine in the REO aerogels leads to a poisoning effect in catalysis applications and can extinguish photoluminescence. Alternatively, chlorine-free methods would produce precipitate rather than monolithic aerogels.

The synthesis of contaminant-free, monolithic REO aerogels via epoxide-assisted sol-gel method remains a significant challenge.

SUMMARY

Disclosed here is an epoxide-assisted sol-gel method to produce chlorine-free, monolithic REO aerogels in hours. The method involves the use of a base catalyst in a reaction mixture comprising a nitrate precursor and epoxide to facilitate the sol-gel transition of the nitrate precursor. The gels can then be dried and calcined to produce chlorine-free, low-density, high surface area REO aerogels covering the lanthanide elements.

Therefore, one aspect of some embodiments of the invention relates to a method for making a monolithic REO aerogel, comprising: preparing a reaction mixture comprising at least one rare earth metal nitrate, at least one epoxide, at least one base catalyst, and at least one organic solvent; curing the mixture to produce a wet gel; drying the wet gel to produce a dry gel; and thermally annealing the dry gel to produce the monolithic REO aerogel.

Another aspect of some embodiments of the invention relates to a monolithic REO aerogel free of chlorine contaminants, which can be obtained by the method described herein.

Another aspect of some embodiments of the invention relates to a monolithic lanthanide oxide aerogel free of chlorine contaminants, which can be obtained by the method described herein.

Another aspect of some embodiments of the invention relates to a monolithic lanthanum oxide aerogel free of chlorine contaminants, which can be obtained by the method described herein.

Another aspect of some embodiments of the invention relates to a monolithic lanthanum:cerium oxide aerogel free of chlorine contaminants, which can be obtained by the method described herein.

Another aspect of some embodiments of the invention relates to a monolithic praseodymium oxide aerogel free of chlorine contaminants, which can be obtained by the method described herein.

Another aspect of some embodiments of the invention relates to a monolithic neodymium oxide aerogel free of chlorine contaminants, which can be obtained by the method described herein.

Another aspect of some embodiments of the invention relates to a monolithic samarium oxide aerogel free of chlorine contaminants, which can be obtained by the method described herein.

Another aspect of some embodiments of the invention relates to a monolithic europium oxide aerogel free of chlorine contaminants, which can be obtained by the method described herein.

Another aspect of some embodiments of the invention relates to a monolithic gadolinium oxide aerogel free of chlorine contaminants, which can be obtained by the method described herein.

Another aspect of some embodiments of the invention relates to a monolithic terbium oxide aerogel free of chlorine contaminants, which can be obtained by the method described herein.

Another aspect of some embodiments of the invention relates to a monolithic dysprosium oxide aerogel free of chlorine contaminants, which can be obtained by the method described herein.

Another aspect of some embodiments of the invention relates to a monolithic holmium oxide aerogel free of chlorine contaminants, which can be obtained by the method described herein.

Another aspect of some embodiments of the invention relates to a monolithic erbium oxide aerogel free of chlorine contaminants, which can be obtained by the method described herein.

Another aspect of some embodiments of the invention relates to a monolithic thulium oxide aerogel free of chlorine contaminants, which can be obtained by the method described herein.

Another aspect of some embodiments of the invention relates to a monolithic ytterbium oxide aerogel free of chlorine contaminants, which can be obtained by the method described herein.

Another aspect of some embodiments of the invention relates to a monolithic lutetium oxide aerogel free of chlorine contaminants, which can be obtained by the method described herein.

Another aspect of some embodiments of the invention relates to a monolithic scandium oxide aerogel free of chlorine contaminants, which can be obtained by the method described herein.

Another aspect of some embodiments of the invention relates to a monolithic yttrium oxide aerogel free of chlorine contaminants, which can be obtained by the method described herein.

A further aspect of some embodiments of the invention relates to an REO aerogel comprising a network of REO nano structures (e.g., nanoparticles), wherein the REO aerogel is a monolith having at least one lateral dimension of at least 1 cm, wherein the REO aerogel has a density of about 40-500 $mg/cm^3$ and/or a BET surface area of at least about 20 $m^2/g$, and wherein the REO aerogel is substantially free of oxychloride.

A further aspect of some embodiments of the invention relates to a device incorporating the REO aerogel described herein.

DETAILED DESCRIPTION

Figure 1:
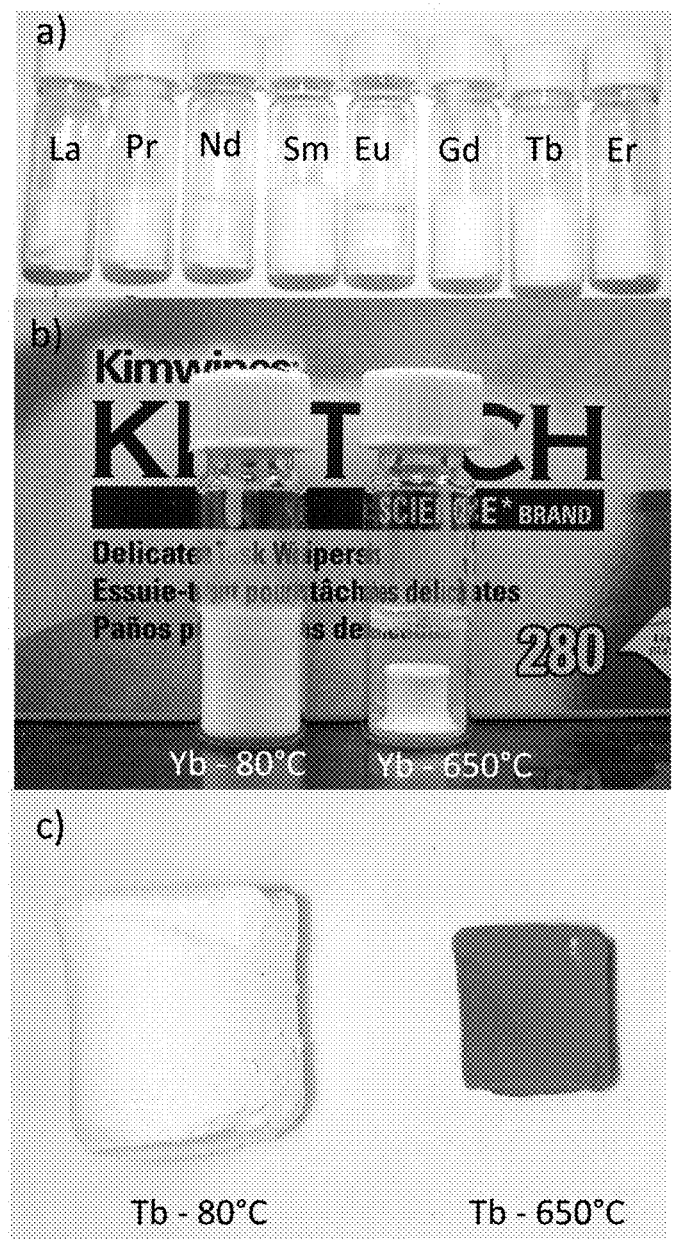
FIG. 1: Photographs of a) selected as-made REO aerogels, b) Yb oxide aerogel as-made and after calcination at 650° C., and c) Tb oxide aerogel as-made and after calcination at 650° C.

Reference will now be made in detail to some specific embodiments of the invention contemplated by the inventors for carrying out the invention. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

Method for Making Rare Earth Oxide Aerogel

Many embodiments of the invention described herein relates to a method for making a monolithic REO aerogel, comprising: preparing a reaction mixture comprising at least one rare earth metal nitrate, at least one epoxide, at least one base catalyst, and at least one organic solvent; curing the mixture to produce a wet gel; drying the wet gel to produce a dry gel; and thermally annealing the dry gel to produce the monolithic REO aerogel.

In some embodiments, the reaction mixture comprises at least one lanthanide nitrate. In some embodiments, the reaction mixture comprises lanthanum nitrate. In some embodiments, the reaction mixture comprises cerium nitrate. In some embodiments, the reaction mixture comprises praseodymium nitrate. In some embodiments, the reaction mixture comprises neodymium nitrate. In some embodiments, the reaction mixture comprises promethium nitrate. In some embodiments, the reaction mixture comprises samarium nitrate. In some embodiments, the reaction mixture comprises europium nitrate. In some embodiments, the reaction mixture comprises gadolinium nitrate. In some embodiments, the reaction mixture comprises terbium nitrate. In some embodiments, the reaction mixture comprises dysprosium nitrate. In some embodiments, the reaction mixture comprises holmium nitrate. In some embodiments, the reaction mixture comprises erbium nitrate. In some embodiments, the reaction mixture comprises thulium nitrate. In some embodiments, the reaction mixture comprises ytterbium nitrate. In some embodiments, the reaction mixture comprises lutetium nitrate. In some embodiments, the reaction mixture comprises scandium nitrate. In some embodiments, the reaction mixture comprises yttrium nitrate.

In some embodiments, the concentration of the rare earth metal nitrate in the reaction mixture is about 1-10 mmol per 5 ml solvent.

In some embodiments, the reaction mixture comprises at least two different rare earth metal nitrates or at least two different lanthanide nitrates. In some embodiments, the reaction mixture comprises at least three different rare earth metal nitrates or at least three different lanthanide nitrates.

In some embodiments, the reaction mixture is substantially or totally free of chloride.

In some embodiments, the reaction mixture comprises a base catalyst selected from ammonium carbonate, sodium carbonate, sodium hydroxide, ammonium hydroxide, and ammonia vapor. In some embodiments, the base catalyst is ammonium carbonate. The concentration of the base catalyst in the reaction mixture may depend on the strength of the base. In some embodiments, a saturated ammonium carbonate ethanolic solution is used, which has a concentration of 21 mg ammonium carbonate per 1 ml of ethanol. In some embodiments, 100 µL concentrated ammonium hydroxide in 1 ml $H_2O$ is added to reaction solution.

In some embodiments, the base catalyst is not a chelating agent. In some embodiments, the base catalyst is not an organic acid.

In some embodiments, the reaction mixture comprises an epoxide selected from propylene oxide, ethylene oxide, trimethylene oxide, and dimethylene oxide. In some embodiments, the epoxide is propylene oxide. In some embodiments, the concentration of the epoxide in the reaction mixture is about 10-50 mmol per 5 ml ethanol, or about 27 mmol per 5 ml ethanol.

In some embodiments, the reaction mixture comprises an organic solvent selected from alcohol. In some embodiments, the organic solvent is selected from ethanol, methanol, propanol, and butanol. In some embodiments, the organic solvent is ethanol.

In some embodiments, the reaction mixture consists essentially of or consists of the rare earth metal nitrate, the epoxide, the base catalyst, and the organic solvent. In some embodiments, the reaction mixture consists essentially of or consists of lanthanide nitrate, propylene oxide, ammonium carbonate, and alcohol.

In some embodiments, the reaction mixture is cured at a temperature of about 25°-100° C., or about 50°-100° C., or about 60°-100° C., or about 80°-85° C. to produce a wet gel. When ammonium carbonate is used as the catalyst, heating is applied to cure the reaction mixture. On the other hand, when ammonia vapor is used as the catalyst, the reaction mixture can be cured at room-temperature.

In some embodiments, the reaction mixture is cured from about 10 minutes to about 12 hours, or from about 20 minutes to about 8 hours, or about 40 minutes to about 6 hours, or from about 1 hour to about 4 hours. In some embodiments, the reaction mixture is cured at atmospheric pressure.

In some embodiments, the wet gel is washed by solvent exchange to remove reaction by-products. Suitable solvent include, but are not limited to, acetone or dry alcohol. In some embodiments, the wet gel is subjected to solvent exchange to remove water.

In some embodiments, the wet gel is dried under supercritical condition (e.g., using methanol or liquid carbon dioxide). In some embodiments, the wet gel is dried under ambient temperature and pressure to produce a higher density monolith. In some embodiments, the wet gel is freeze dried.

In some embodiments, the dry gel is thermally annealed at a temperature of at least about 300° C., or at least about 400° C., or at least about 500° C., or at least about 600° C., to produce the monolithic REO aerogel. In some embodiments, the dry gel is thermally annealed at a temperature of about 300° C., or about 350° C., or about 400° C., or about 450° C., or about 500° C., or about 550° C., or about 600° C., or about 650° C., or about 700° C., to produce the monolithic REO aerogel. In some embodiments, the dry gel is thermally annealed in air. In some embodiments, the dry gel is thermally annealed in an inert environment. The thermal annealing step can take about one hour.

In some embodiments, the REO aerogel is produced in less than about 120 hours, or less than about 72 hours, or less than about 48 hours, or less than about 24 hours, or less than about 12 hours, or less than about 6 hours, from the start of the curing step to the end of the thermal annealing step.

Rare Earth Oxide Aerogel

Many embodiments of the invention described herein relate to a monolithic REO aerogel. In some embodiments, the REO aerogel is a monolith having at least one dimension of at least about 0.1 cm, or at least about 1 cm, or at least about 10 cm. In some embodiments, the REO aerogel is a monolith having at least two dimensions of at least about 0.1 cm, or at least about 0.5 cm, or at least about 1 cm, or at least about 5 cm. In some embodiments, the REO aerogel is a monolith having at least three dimensions of at least about 0.1 cm, or at least about 0.5 cm, or at least about 1 cm, or at least about 5 cm.

In some embodiments, the REO aerogel is a lanthanide oxide aerogel. In some embodiments, the REO aerogel is a lanthanum oxide aerogel. In some embodiments, the REO aerogel is a cerium oxide aerogel. In some embodiments, the REO aerogel is a praseodymium oxide aerogel. In some embodiments, the REO aerogel is a neodymium oxide aerogel. In some embodiments, the REO aerogel is a promethium oxide aerogel. In some embodiments, the REO aerogel is a samarium oxide aerogel. In some embodiments, the REO aerogel is an europium oxide aerogel. In some embodiments, the REO aerogel is a gadolinium oxide aerogel. In some embodiments, the REO aerogel is a terbium oxide aerogel. In some embodiments, the REO aerogel is a dysprosium oxide aerogel. In some embodiments, the REO aerogel is a holmium oxide aerogel. In some embodiments, the REO aerogel is an erbium oxide aerogel. In some embodiments, the REO aerogel is a thulium oxide aerogel. In some embodiments, the REO aerogel is a ytterbium oxide aerogel. In some embodiments, the REO aerogel is a lutetium oxide aerogel. In some embodiments, the REO aerogel is a scandium oxide aerogel. In some embodiments, the REO aerogel is a yttrium oxide aerogel.

In some embodiments, the REO aerogel comprises at least two different rare earth metals or lanthanides. In some embodiments, the REO aerogel comprises at least three different rare earth metals or lanthanides.

The REO aerogel described herein can have a low bulk density. In some embodiments, the REO aerogel has a density of about 500 mg/cm$^3$ or less, or about 300 mg/cm$^3$ or less, or about 200 mg/cm$^3$ or less, or about 100 mg/cm$^3$ or less, or about 20-500 mg/cm$^3$, or about 20-100 mg/cm$^3$, or about 100-250 mg/cm$^3$, or about 250-500 mg/cm$^3$.

The REO aerogel described herein can have a high Brunauer-Emmett-Teller (BET) surface area. In some embodiments, the REO aerogel has a BET surface area of about 10 m$^2$/g or more, or about 20 m$^2$/g or more, or about 50 m$^2$/g or more, or about 100 m$^2$/g or more, or about 200 m$^2$/g or more, or about 10-500 m$^2$/g, or about 20-200 m$^2$/g, or about 20-100 m$^2$/g, or about 100-200 m$^2$/g.

In some embodiments, the REO aerogel has a Barrett-Joyner-Halenda (BJH) pore volume of about 0.1 cm$^3$/g or more, or about 0.2 cm$^3$/g or more, or about 0.3 cm$^3$/g or more, or about 0.4 cm$^3$/g or more, or about 0.5 cm$^3$/g or more, or about 0.1-2 cm$^3$/g, or about 0.1-1 cm$^3$/g, or about 0.2-0.8 cm$^3$/g.

In some embodiments, the REO aerogel has an average BJH pore diameter of about 5-100 nm, or about 10-50 nm, or about 15-23 nm.

The REO aerogel described herein can have a high atomic content of rare earth metal. In some embodiments, the REO aerogel has a rare earth metal content of at least about 5 at. %, or at least about 10 at. %, or at least about 15 at. %, or at least about 20 at. %, or at least about 25 at. %, or about 5-40 at. %, or about 10-30 at. %, or about 15-25 at. %.

The REO aerogel described herein can have a low atomic content of impurities (elements other than rare earth metal and oxygen, such as carbon). In some embodiments, the REO aerogel has an impurity content that is about 20 at. % or less, or about 15 at. % or less, or about 10 at. % or less, or about 5 at. % or less, or about 3 at. % or less.

In some embodiments, the REO aerogel is substantially or totally free of oxychloride.

In some embodiments, the REO aerogel comprises an interconnected network of REO nanostructures (e.g., nanoparticles). In some embodiments, the REO nanostructures have an average diameter of about 2-100 nm, or about 5-20 nm, or about 20-50 nm.

In some embodiments, the REO aerogel is a crystalline material. In some embodiments, the REO aerogel is an amorphous material. In some embodiments, the REO aerogel includes both a crystalline phase and an amorphous phase. In some embodiments, the REO aerogel is nanocrystalline with an average crystallite size of about 2-100 nm, or about 5-20 nm, or about 20-50 nm.

In some embodiments, the REO aerogel comprises an interconnected network of REO nanostructures (e.g., nanoparticles), wherein the REO aerogel is a monolith having at least one lateral dimension of at least 1 cm, wherein the REO aerogel has a density of about 40-500 mg/cm$^3$ and/or a BET surface area of at least about 20 m$^2$/g, and wherein the REO aerogel is substantially free of oxychloride.

In some embodiments, the REO aerogel is thermally stable. In some embodiments, the REO aerogel remains monolithic after being heated for 4 hours at a temperature of about 300° C., or about 400° C., or about 500° C., or about 600° C., or about 700° C., or about 800° C., or about 900° C., or about 1000° C., or about 1100° C.

In some embodiments, the REO aerogel is photoluminescent. The chlorine-free REO aerogels exhibit spectra with excitation and emission bands distinct from those observed in chlorine-contaminated REO aerogels. For example, the chlorine-free aerogels will exhibit transitions not observed in the chlorine-contaminated aerogels (e.g. for Tb, interconfigurational Tb$^{3+}$ fd transitions).

Composite Derived from REO Aerogel

A further aspect of the invention described herein relates to a composite derived from the REO aerogel.

The composite can comprise, for example, a metal or a metal compound deposited or disposed onto the internal surfaces of the REO aerogel. The composite can comprise, for example, a transition metal or a metal compound deposited or disposed onto the internal surfaces of the REO aerogel. The composite can comprise, for example, a post-transition metal or a metal compound deposited or disposed onto the internal surfaces of the REO aerogel. The composite can comprise, for example, a lanthanide metal or a metal compound deposited or disposed onto the internal surfaces of the REO aerogel. The composite can comprise, for example, an actinide metal or a metal compound deposited or disposed onto the internal surfaces of the REO aerogel.

The metal or metal compound can be deposited or disposed throughout the entire thickness of the REO aerogel. In some embodiments, the composite comprises a metal nanoparticle deposited or disposed onto the internal surfaces of the REO aerogel. In some embodiments, the composite comprises a metal oxide deposited or disposed onto the internal surfaces of the REO aerogel. In some embodiments, the composite comprises a metal chalcogenide (e.g., a metal sulfide) deposited or disposed onto the internal surfaces of the REO aerogel. In some embodiments, the composite comprises a metal nitride deposited or disposed onto the internal surfaces of the REO aerogel. In some embodiments, the composite comprises a metal carbide deposited or disposed onto the internal surfaces of the REO aerogel. In some embodiments, the composite comprises a metal carbonitride deposited or disposed onto the internal surfaces of the REO aerogel. Methods for depositing the metal or metal compound can be found in U.S. Pat. No. 8,664,143, US Pat. Pub. No. 2014/0121425, US Pat. Pub. No. 2014/0178759, and U.S. patent application Ser. No. 14/485,474, each of which is incorporated herein by reference.

The composite can comprise, for example, a silicon or boron compound deposited or disposed onto the internal surfaces of the REO aerogel. The silicon or boron compound can be deposited or disposed throughout the entire thickness of the REO aerogel. In some embodiments, the composite comprises a silicon compound (e.g., silicon oxide, silicon carbide, silicon nitride) deposited or disposed onto the internal surfaces of the REO aerogel. In some embodiments, the composite comprises a boron compound (e.g., boron nitride) deposited or disposed onto the internal surfaces of the REO aerogel. Methods for depositing or deriving the silicon or boron compound can be found in U.S. Pat. No. 8,629,076 and US Pat. Pub. No. 2015/0004087, each of which is incorporated herein by reference.

The composite can comprise, for example, a polymer deposited or disposed onto the internal surfaces of the REO aerogel. The polymer can be deposited or disposed throughout the entire thickness of the REO aerogel. In some embodiments, the composite comprises polydimethylsiloxane or epoxy deposited or disposed onto the internal surfaces of the REO aerogel. Methods for depositing the polymer can be found in U.S. Pat. No. 9,087,625, which is incorporated herein by reference.

Applications

The REO aerogels described herein have a variety of applications, including in or as laser materials, scintillators, catalysts and photo-catalysts, ionic conductors, magnetic devices, glass and ceramic colorants, and solid oxide fuel cell materials.

WORKING EXAMPLES

Example 1—Methods

Rare earth oxide aerogel synthesis. Dissolve 3 mmol lanthanide nitrate hydrate in alcohol (e.g. ethanol). Add 1.6 g epoxide (e.g. propylene oxide) and 750 μl of alcohol saturated with ammonium carbonate. Seal solution in vial and heat to 80 degrees Celsius until gel is formed (minutes to hours). Alternatives to the use of ammonium carbonate involve the use of ammonia vapor at room-temperature to cause gelation of the solution of nitrate and epoxide. The alcogel is then washed (in acetone or dry alcohol) to remove any byproducts (e.g. water). Supercritical drying (e.g. methanol or liquid carbon dioxide) is used to produce the aerogel. Ambient drying can be used to produce a higher density monolith. Annealing in air can be used to modify the crystalline nature of the aerogels.

To realize the sol-gel transition with the nitrate precursor, a base catalyst such as ammonium carbonate was added to the solution. When the nitrate precursor is used, the pH of the solution remains constant so that gelation, which requires alkaline pH, does not occur. With the addition of ammonium carbonate and moderate heat, however, the conditions for gelation are satisfied.

Electron Microscopy. Field-emission scanning electron microscopy (FE-SEM) and energy dispersive x-ray (EDX) analysis was performed on a JEOL 7401-F at 10 keV (20 mA) in lower secondary electron imaging mode with a working distance of 2-8 mm. High resolution transmission electron microscopy (HRTEM) characterization was performed on an electron microscope.

X-ray photoelectron spectroscopy. X-ray photoelectron spectroscopy (XPS) was performed on a PHI Quantum 2000 system using a focused monochromatic Al Kα X-ray source (1486.6 eV) for excitation and a spherical section analyzer with 16-element multichannel detection system. The X-ray beam is incident normal to the sample and the detector is 45° from normal. Spectra were collected with 200 μm X-ray spot using a pass energy of 23.5 eV, giving an energy resolution of 0.3 eV that when combined with the 0.85 eV full width half maximum (FWHM) Al Kα line width gives a resolvable XPS peak width of 1.2 eV. Deconvolution of non-resolved peaks was accomplished using Multipak 9.2 (PHI) curve fitting routines with asymmetric or Gaussian-Lorentzian line-shapes and a Shirley background. The collected data were referenced to an energy scale with binding energies for Cu $2p_{3/2}$ at 932.72+/−0.05 eV and Au $4f_{7/2}$ at 84.01+/−0.05 eV. Binding energies were also referenced to the C 1 s photoelectron line arising from adventitious carbon at 284.6 eV. Low energy electrons and ions were used for specimen neutralization.

Nitrogen Porosimetry. Textural properties were determined by Brunauer-Emmett-Teller (BET) and Barrett-Joyner-Halenda (BJH) methods using an ASAP 2020 Surface Area Analyzer (Micromeritics Instrument Corporation) via nitrogen porosimetry. Samples of approximately 0.1 g were heated to 150° C. under vacuum ($10^{-5}$ Torr) for at least 24 hours to remove all adsorbed species.

X-ray Diffraction. Powder X-ray diffraction patterns were collected using a Bragg-Brentano geometry on a X'Pert MPD powder diffractometer (Panalytical, Almelo, Netherlands). The instrument was equipped with a secondary Ni filter, Cu $K\alpha_{1,2}$ radiation ($\lambda_1$=154.0596 pm, $\lambda_2$=154.4493 pm), and an X'Celerator multi-strip detector. Data were collected at ambient condition in the 2θ range from 10° to 100°, a step width of 0.0167°/step and a total collection time of 160 s/step. X-ray powder data Rietveld refinements were carried out using Diffrac$^{Plus}$ Topas 4.2 software (Bruker AXS GmbH, Karlsruhe, Germany). To describe the X-ray diffraction profile the fundamental parameter approach was applied in the Rietveld refinements. For the diffractometer configuration, the corresponding fundamental parameters were fitted to powder data of standard $LaB_6$. During the refinements, general parameters such as scale factors and background parameters (Chebychev polynomial) were optimized. Additionally, the cell parameters, atomic coordinates and isotropic atomic displacement parameters, average crystallite size $L_{vol}$(IB) and micro-strain ($\varepsilon_0$) were refined.

Photoluminescence. The photoluminescence spectra in the visible and NIR spectral ranges were recorded at room-temperature and at 13 K with a modular double grating excitation spectrofluorimeter with a TRIAX 320 emission monochromator (Fluorolog-3, Horiba Scientific) coupled to a R928 and H9170 Hamamatsu photomultipliers, respectively, using a front face acquisition mode. The excitation source was a 450 W Xe arc lamp. The emission spectra were corrected for detection and optical spectral response of the spectrofluorimeter and the excitation spectra were corrected for the spectral distribution of the lamp intensity using a photodiode reference detector. The emission decay curves for the $Eu^{3+}$ and $Tb^{3+}$-based aerogels were measured with the setup described for the luminescence spectra using a pulsed Xe—Hg lamp (6 μs pulse at half width and 20-30 μs tail). Emission decay curves for the nd-based aerogels were recorded between at room temperature with a Fluorolog TCSPC spectrofluorometer (Horiba Scientific) coupled to a TBX-04 photomultiplier tube module (950 V), 200 ns time-to-amplitude converter and 70 ns delay. The exciting source was a Horiba Scientific pulsed diode light source (SpectraLED-355, peak at 356 nm).

Density. Bulk densities of the samples were determined from the physical dimensions and mass of each sample.

Example 2—Results

The use of a modified epoxide-assisted sol-gel method produced gels for lanthanide nitrate hydrates. At 80° C., the nitrate solutions formed opaque, white gels within two hours (FIG. 1a). In contrast to the vibrantly colored gels generated via the chloride precursor, the colors of the nitrate salts were only faintly visible in their aerogels (FIG. 1a). Also, unlike the chloride-derived gels, gelation of nitrate solutions at room-temperature was not observed. This is presumed to be due to the need to sufficiently decompose the ammonium carbonate in order to generate the pH increase needed for gel formation. Ammonium carbonate can decompose and release ammonia in hot water, thus the moderate heating to 80° C. facilitates this process. Other methods of raising pH at room-temperature were also attempted (e.g. addition of strong base such as ammonium hydroxide, ammonia vapor, etc.), but these methods may lead to precipitates or inhomogeneous gels. The samples prepared with ammonium carbonate at 80° C. showed little to no shrinkage upon gelation but shrunk after calcination at 650° C., remaining opaque and white (FIG. 1b). Terbium and praseodymium were the exceptions, turning a rich brown and black color, respectively, upon heating (FIG. 1c).

Textural properties of the REO aerogels are presented in Table 1. Like the chloride-derived aerogels, the nitrogen adsorption-desorption isotherms for the nitrate-derived REO aerogels were type IV (IUPAC classification) with very small HI hysteresis loops at high relative pressures characteristic of mesoporous and possibly macroporous networks. The BET surface areas of these aerogels remained large, but decreased after calcination at 650° C. The average pore diameters ranged from 15-23 nm with fairly broad size distributions. Pore volumes ranged from 0.2 to 0.8 cm$^3$/g. The high porosity of these materials is consistent with the low densities observed, ranging from <50 mg/cm$^3$ as-made to >100 mg/cm$^3$ after calcination.

TABLE 1

Physical data for selected REO aerogels prepared from the lanthanide nitrate hydrate using the modified epoxide-assisted sol-gel method.

| LnO$_x$ | Density, mg/cm$^3$ | BET surface area, m$^2$/g | BJH pore volume, cm$^3$/g | BJH pore diameter, nm |
|---|---|---|---|---|
| La | 40 | 148 | 0.8 | 20 |
| La:Ce | 49 (112) | 125 | 0.69 | 23 |
| Pr | 67 | 51 (36) | 0.21 | 18 |
| Nd | 123 | 39 (42) | 0.15 | 15 |
| Sm | 117 | 54 (40) | 0.27 | 19 |
| Eu | 73 (120) | 148 (25) | 0.59 | 16 |
| Tb | 94 (225) | 95 (21) | 0.43 | 17 |
| Er | 63 | 82 (50) | 0.40 | 19 |
| Tm | 72 (134) | 142 (64) | 0.61 | 15 |
| Yb | 72 (166) | 129 (52) | 0.46 | 17 |
| Lu | 59 (149) | 87 (36) | 0.48 | 22 |

Figure 2:
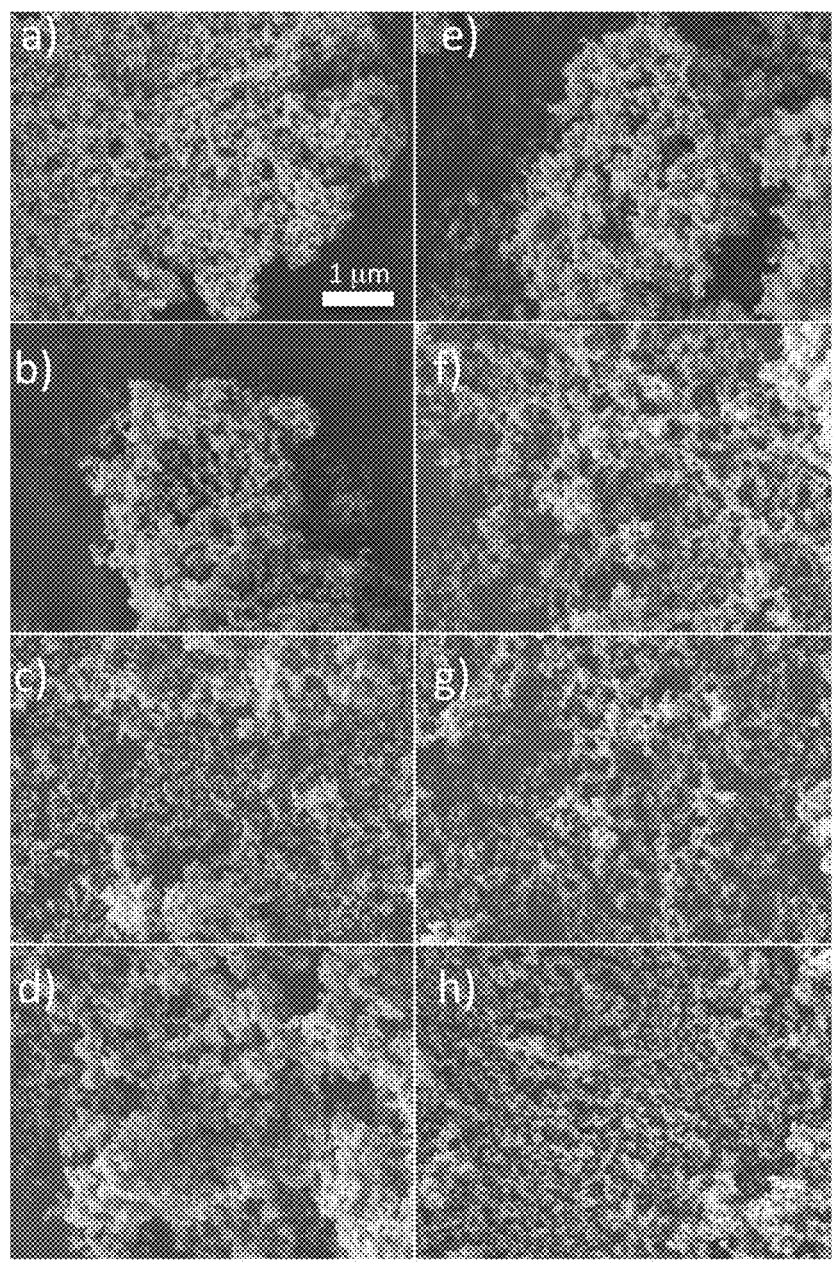
FIG. 2: SEM images of as-made REO aerogels based on a) La:Ce, b) Sm, c) Eu, d) Gd, e) Dy, f) Ho, g) Tm, and h) Lu. All images are at the same magnification.
Figure 3:
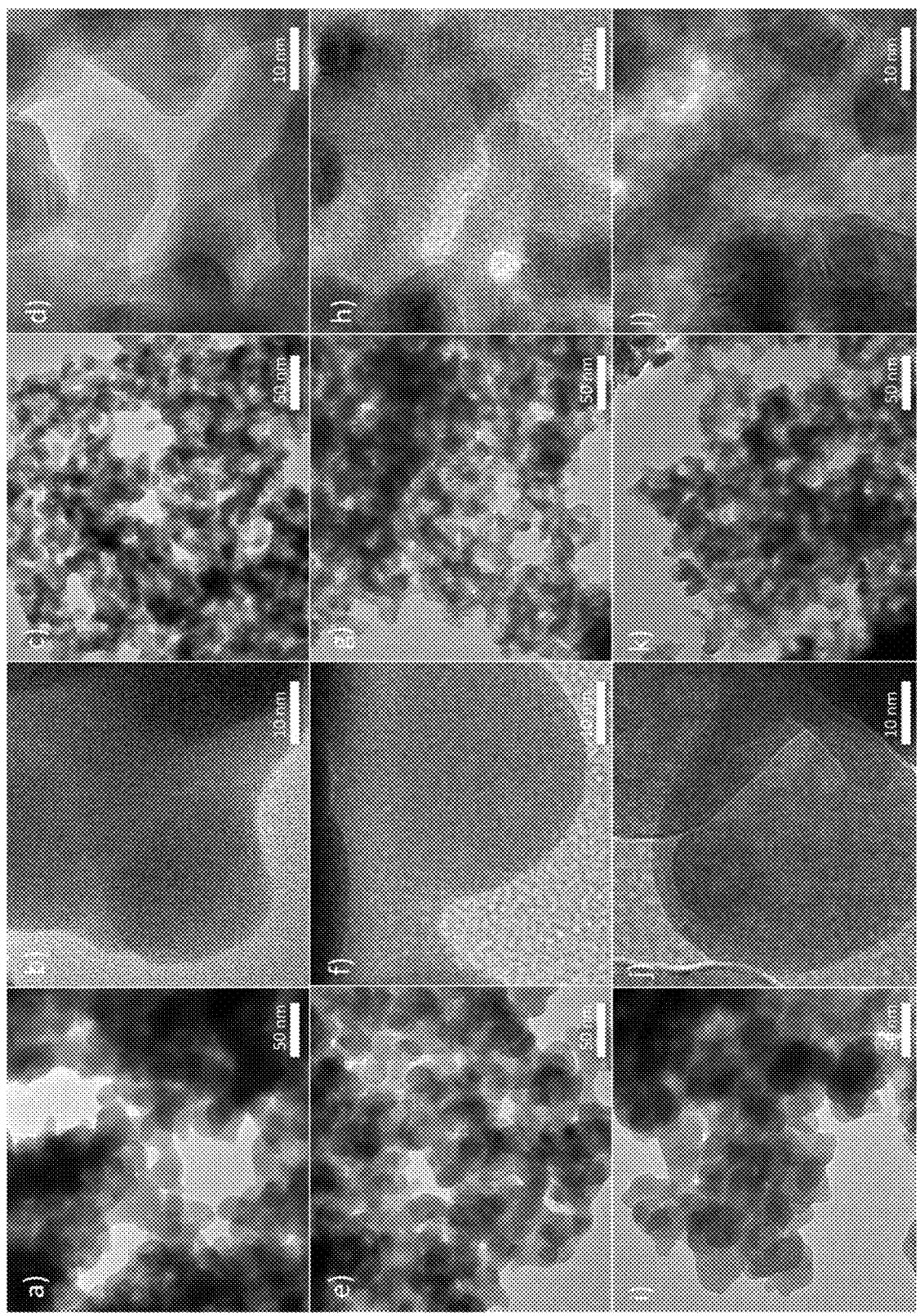
FIG. 3: TEM images of Sm oxide aerogel as-made at a) low and b) high magnification, and after calcination at c) low and d) high magnification. TEM images of Gd oxide aerogel as-made at e) low and f) high magnification, and after calcination at g) low and h) high magnification. TEM images of Tb oxide aerogel as-made at i) low and j) high magnification, and after calcination at k) low and l) high magnification.
Figure 4:
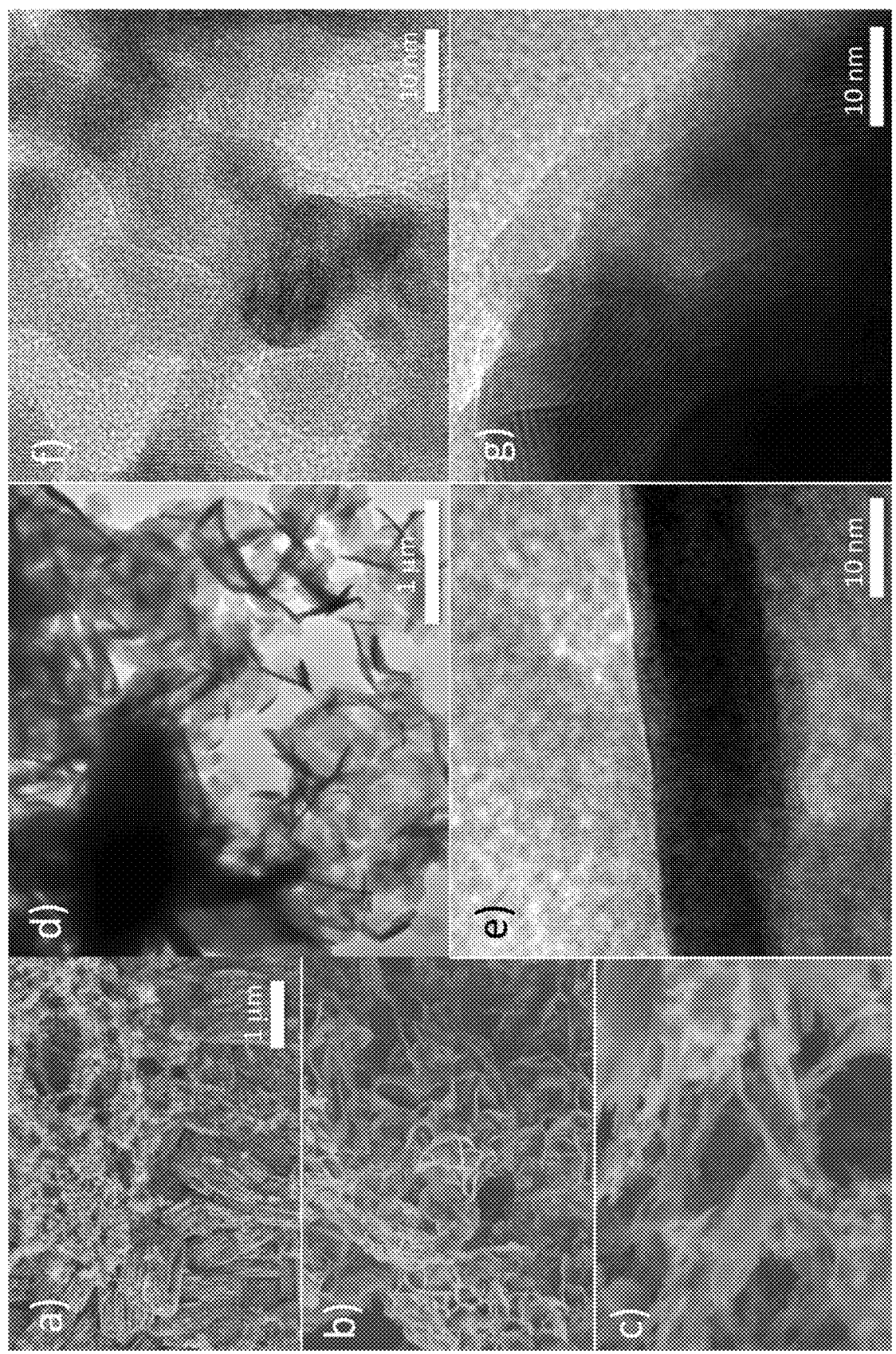
FIG. 4: SEM images of as-made a) La, b) Pr, and c) Nd oxide aerogels. TEM images of as-made Nd oxide aerogel at d) low and e) high magnification. TEM images of calcined f) La and g) Pr oxide aerogels.

Despite the apparent homogenous appearance of the series of nitrate-derived aerogels, more in-depth characterization of the microstructure reveals some distinguishing features. Scanning electron micrographs (SEM) show that the majority of REO aerogels (La:Ce, Eu, Gd, Tb, Dy, Ho, Er, Tm, Yb, and Lu) consist of a network of nanoparticles (FIG. 2). Further analysis of transmission electron micrographs (TEM) reveals that the particles have diameters ranging from 20-50 nm as-made and 5-20 nm after calcination (FIG. 3). This morphology is similar to that observed for the chloride-derived REO aerogels. However, some REO aerogels show quite different morphologies ranging from lamellar structure (La), to various leaf-like structures (Nd and Pr), not unlike the diversity of morphologies observed in alumina and iron oxide aerogels (FIG. 4). TEM indicates that all the REO aerogels are poorly crystalline or amorphous as-made (FIG. 3), except for Nd which exhibited lattice fringes (FIG. 4). After calcination at 650° C., crystalline phases formed for all the REO aerogels (FIGS. 3 and 4).

X-ray photoelectron spectroscopy (XPS) was performed on the REO aerogels with the low-symmetry phases (La, Nd, Pr) to provide more insight into their composition. The as-prepared aerogels showed high concentrations of carbon (20-40 at. %) and, in the case of Pr, some nitrogen (~9 at. %). This suggests the presence of carbonate, stemming from $CO_2$ absorption from the critical point drying or from the air. The nitrogen in the Pr gel is likely from the nitrate precursor.

Photoluminescence. FIG. 5A shows the room-temperature emission spectra of the chlorine-free $Eu^{3+}$ (Eu-3) and $Tb^{3+}$ (Tb-18) aerogels that reveal a series of straight lines ascribed to the $^5D_0 \rightarrow ^7F_{0-4}$ ($Eu^{3+}$) and $^5D_4 \rightarrow ^7F_{5-1}$ transitions ($Eu^{3+}$). For the chlorine-free $Sm^{3+}$ (Sm17)-containing material, no sign of the intra-$4f^5$ transitions could be detected at room-temperature. Nevertheless, at low temperature it is observed a broad band ascribed to the host peaking around 523 nm and a series of low-relative intensity lines attributed to the $Sm^{3+}$ $^4G_4 \rightarrow ^6H_{5/2-11/2}$ transitions. Also noted is the presence of a series of intra-$4f^5$ self-absorption lines that are superimposed in the broad band, pointing the presence of host-to-$Sm^{3+}$ radiative energy transfer at 12 K due to the so-called inner-filter effect.

The excitation spectra were monitored within the more intense transition, e.g., $^5D_0 \rightarrow ^7F_2$ ($Eu^{3+}$), $^5D_4 \rightarrow ^7F_5$ ($Tb^{3+}$) at 300 K and $^5G_4 \rightarrow ^6H_{9/2}$ ($Sm^{3+}$) at 12 K (FIG. 5B). At room-temperature, the spectrum of Eu-3 shows a series of straight lines ascribed to transitions between the $^7F_0$ level of the ground multiplet and the $^5H_7, ^5D_{4,2}, ^5G_{2-6}$, and $^5L_6$ excited states and that of Tb18 reveals a series of straight lines related with transitions between the $^7F_6$ levels and the $^5G_{6,4}, ^5L_{10,9}$ and $^5D_2$ states. The excitation spectrum of Sm-17 displays a series of intra-$4f^5$ transition between the $^6H_{5/2}$ state and the excited states labeled in FIG. 5B. It is noted that the direct intra-4f excitation is the main path for the population of the lanthanides' excited states in the chlorine-free materials.

Aiming at further detail the photoluminescence features of Eu-3, the emission and excitation spectra were also studied at low-temperature. Despite the fact at 12 K the emission spectrum of the Eu-3 resembles that acquired at 300 K (FIG. 5A), the low temperature excitation spectrum reveals the appearance of a broad band in the UV range with two components at 270 nm and 340 nm (marked in FIG. 5B), whose origin is discussed below. Nevertheless, the higher relative intensity of the intra-$4f^6$ lines independently of the temperature, points out that direct excitation into the $Eu^{3+}$ excited states is the more efficient excitation path.

Figure 6:
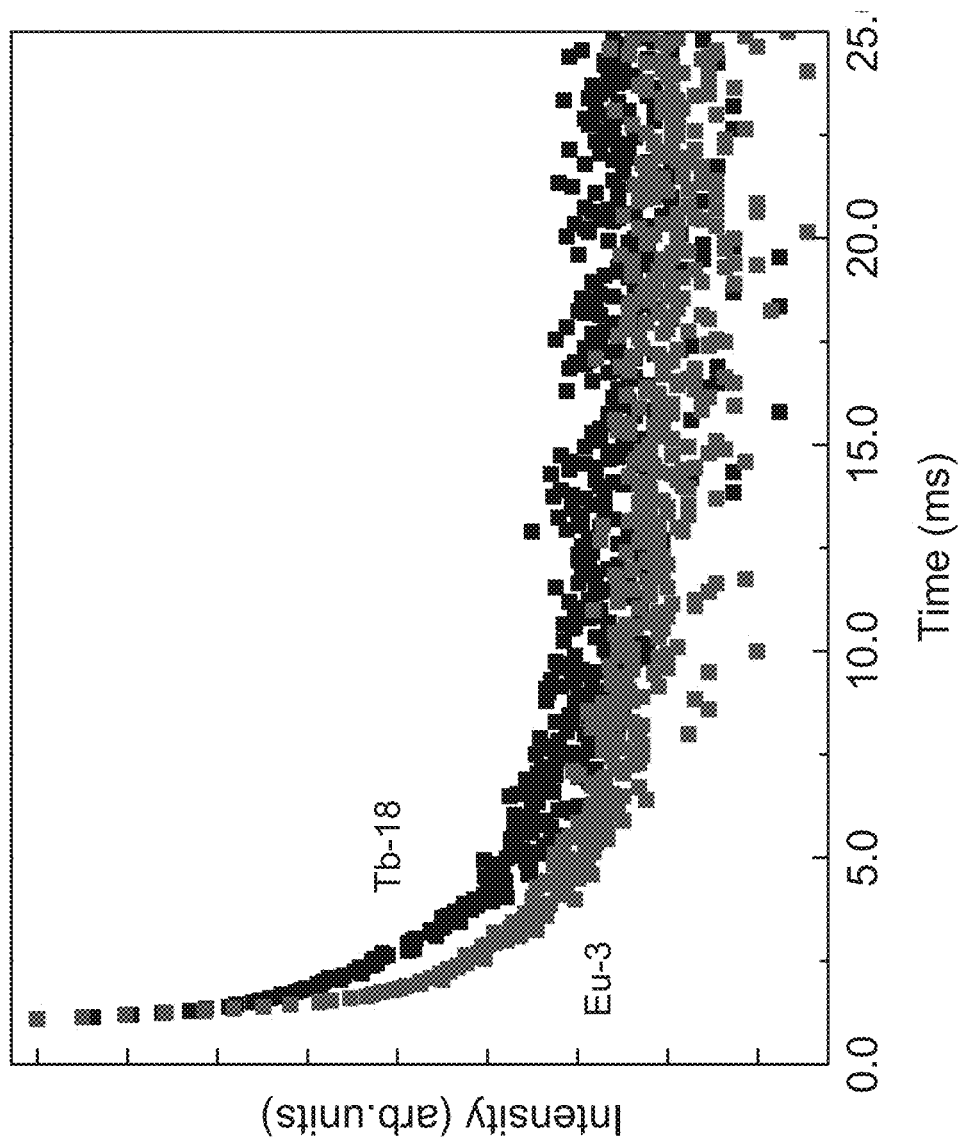
FIG. 6: Room-temperature emission decay curves of Eu-3 and Tb-12 excited at 356 nm and monitored at 615 and 544 nm, respectively. The y-axis is plotted in a log-scale.

The $^5D_0$ ($Eu^{3+}$) and $^5D_4$ ($Tb^{3+}$) emission decay curves were measured at 300 K for Eu-3 and Tb-18. As illustrated in FIG. 6, the emission decay curves deviates from a single exponential behavior at short times. This deviation from a single exponential suggests a large distribution of similar local environments for the $Eu^{3+}$ and $Tb^{3+}$ ions in each sample. Thus, the excited state lifetime values correspond to an average value defined by:

$$\langle \tau \rangle = \frac{\int_{t_0}^{t_1} I(t) \cdot t \cdot dt}{\int_{t_0}^{t_1} I(t) \cdot dt} \quad (1)$$

where I(t) is the emission intensity at time t, $t_0 = 0.05 \times 10^{-3}$ s is the initial delay and $t_1$ is the time value where the luminescence intensity reaches the background. From the data in FIG. 6 and using equation 1, average lifetime values of $1.4 \pm 0.2 \times 10^{-3}$ s and $1.7 \pm 0.2 \times 10^{-3}$ s were calculated for the Eu-3 and Tb-12 aerogels, respectively.

Figure 5:
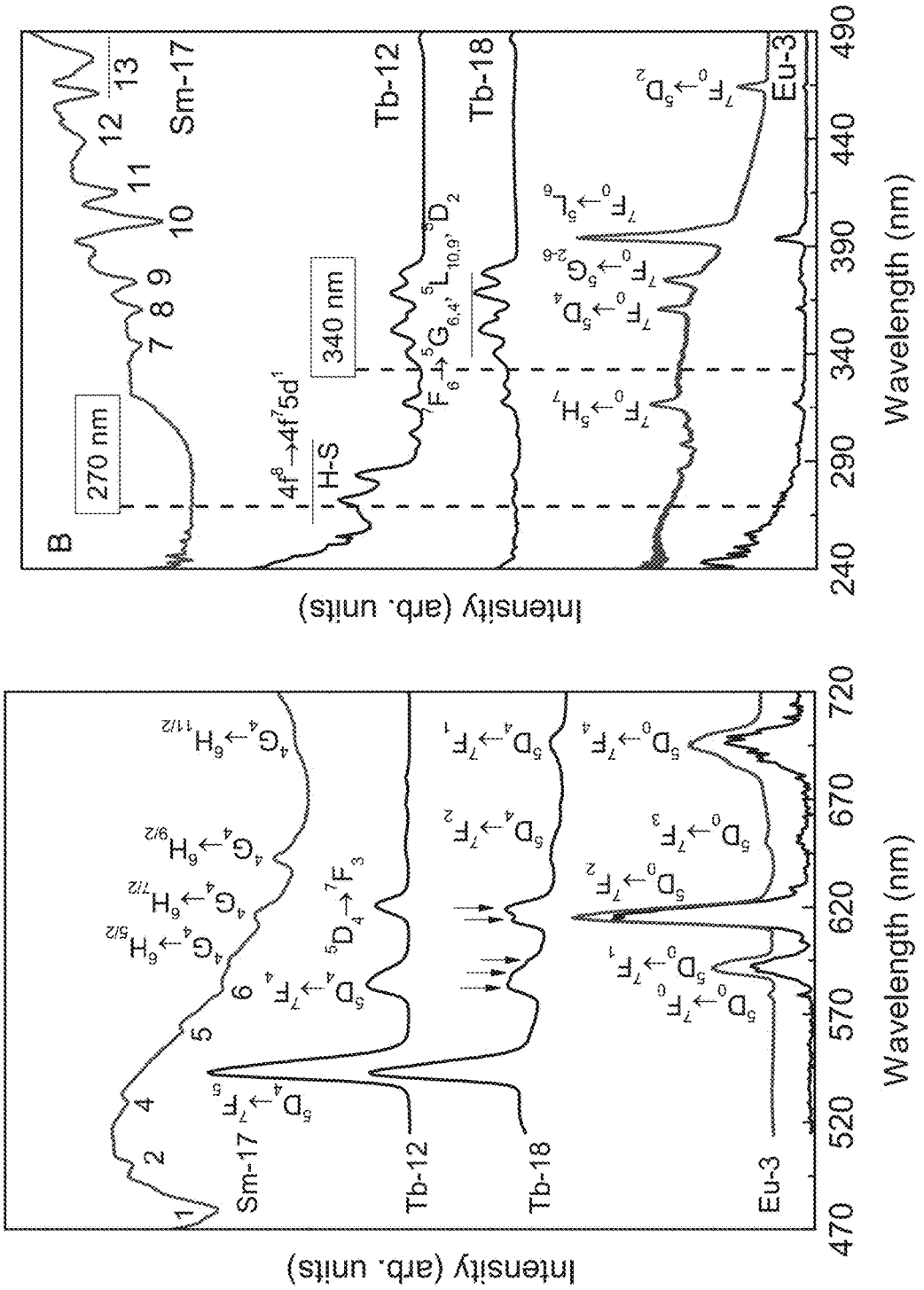
FIG. 5: (A) Emission and (B) excitation spectra of Eu-3, Tb-12, Tb-18 and Sm-17 acquired at 300 K (black lines) and 12 K (blue lines). The emission and excitation spectra of the $Eu^{3+}$, $Tb^{3+}$ and $Sm^{3+}$ aerogels were excited at 393 nm, 368 nm and 392 nm and monitored at 615, 544 and 645 nm, respectively. The self-absorption for Sm-17 are ascribed to transitions between the $^{6}H_{5/2}$ state and the (1, 13) $^{4}I_{13/2,11/2}$, (2) $^{4}M_{15/2}$, (3) $^{4}I_{9/2}$, (4) $^{4}G_{7/2}$, (5) $^{4}F_{3/2}$, (6) $^{4}G_{5/2}$, (7) $^{4}H_{9/2,11/2}$, $^{4}D_{7/2}$, (8) $^{4}D_{3/2,5/2}$, $^{6}P_{5/2}$, $^{4}H_{7/2}$, (9) $^{4}P_{5/2}$, $^{56}P_{5/2,3/2}$, $^{4}F_{7/2}$, $^{4}K_{11/2}$, $^{4}L_{15/2}$, (10) $^{6}P_{3/2}$, $^{4}F_{7/2}$, $^{4}L_{13/2}$, (11) $^{4}M_{19/2}$, $^{6}P_{5/2}$ and (12) $^{4}I_{15/2}$, $^{4}G_{9/2}$, $^{4}M_{17/2}$.

The effect of the chlorine in the photoluminescence properties was evaluated for the case of the $Tb^{3+}$-doped aerogels. The emission and excitation spectra of the chlorine-containing $Tb^{3+}$ material are also depicted in FIG. 5. The emission spectrum shows the typical $Tb^{3+}$ lines, being observed a broadening of the intra-$4f^8$ transitions, so that the Stark components clearly distinguished in the emission spectrum of Tb-18 (marked with arrow in FIG. 5A) cannot be observed, suggesting that the average local environment for the $Tb^{3+}$ ions in each materials is affected by the precursor (nitrate or chloride). The excitation spectrum of Tb-12 monitored within the $^5D_4 \rightarrow ^7F_5$ transition is also different than that found for the chlorine-free Tb18 (FIG. 5B). Despite the presence of a series of straight lines already observed for Tb-18 ($^7F_6 \rightarrow ^5G_{6,4}, ^5L_{10,9}, ^5D_2$ transitions), it is noticed the appearance of two peaks within 250-290 nm, assigned to the spin-forbidden (high-spin, HS) interconfigurational $Tb^{3+}$ fd transitions, that superimpose in a broad band between 240-320 nm, peaking at 270 nm. That band resembles that observed at 12 K for Eu-3.

Figure 7:
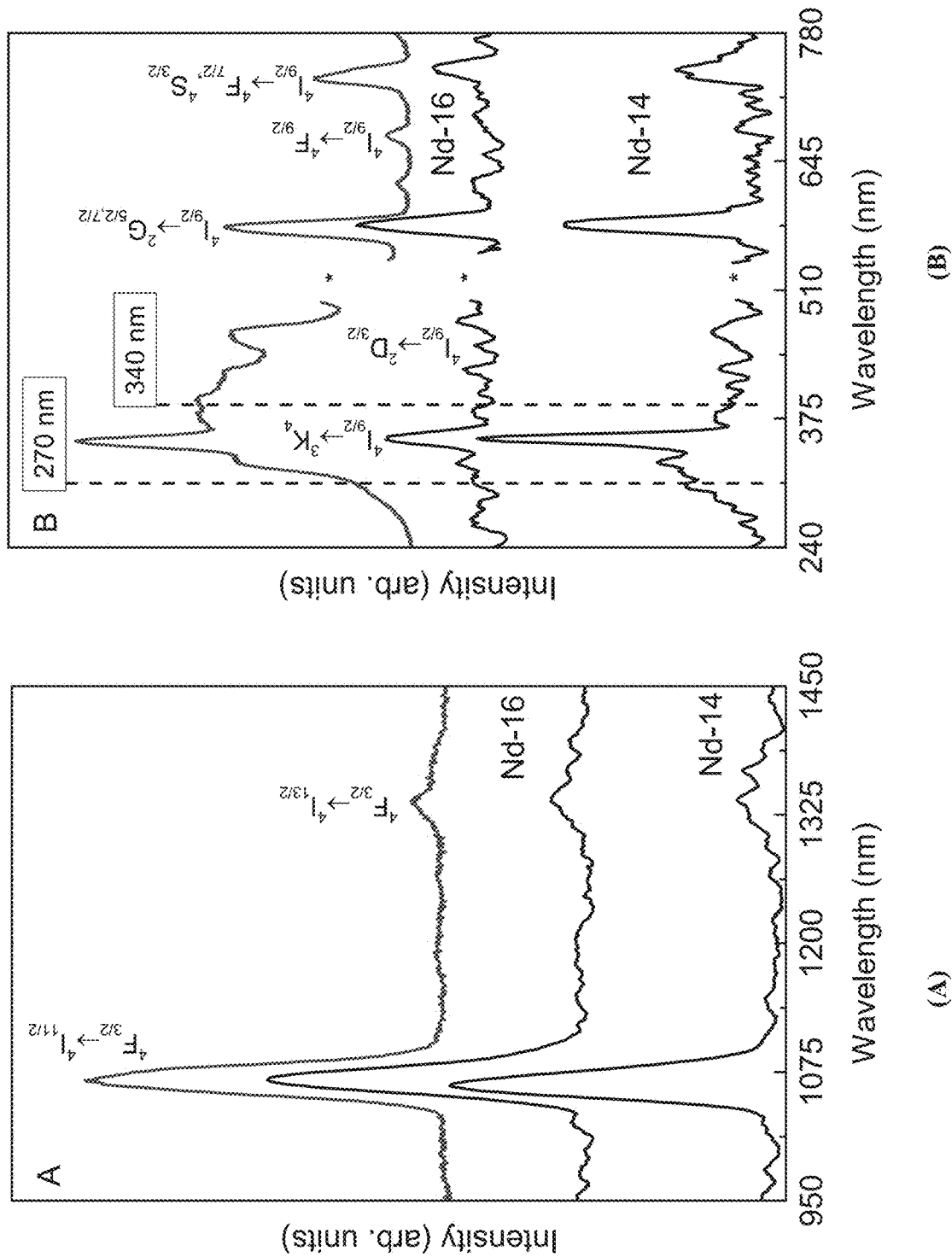
FIG. 7: (A) Emission and (B) excitation spectra of Nd-3 and Nd-16 excited at 580 nm and monitored at 1064 nm, respectively, acquired at 300 K (black lines) and 12 K (blue lines). The asterisk in B assigns the $2^{nd}$ diffraction order of the monitoring wavelength.

The effect of the chlorine in the photoluminescence features of the aerogels was also studied for $Nd^{3+}$-based materials that emit in the near-infrared (NIR) spectral range. As illustrated in FIG. 7A for Nd-14 and Nd-16 aerogels, the NIR emission spectra are formed of the $Nd^{3+}$ $^4F_{3/2} \rightarrow ^4I_{11/2,13/2}$ transitions. The broad spectral profile of the transitions in both materials disables a detailed spectroscopic analysis but it can be noticed an increase in the relative intensity of the $^4F_{3/2} \rightarrow ^4I_{13/2}$ transition with respect to that of $^4F_{3/2} \rightarrow ^4I_{11/2}$ transition, which suggests that the precursor influences the lanthanide local environment, as above mentioned. The excitation spectra was monitored around 1064 nm for both Nd-14 and Nd-16 samples. The spectra display a series of lines attributed to transitions between the ground level $^4I_{9/2}$ and the excited states labeled in FIG. 7B. It is also noted the appearance of a broad band in the low-wavelength region (240-320 nm) for the chlorine containing aerogel (Nd-14) with a peak around 270 nm. The emission and excitation spectra of a selected $Nd^{3+}$ aerogel (Nd-16) were also measured at low-temperature. Whereas the emission spectra resembles that acquired at 300K, apart from an increase ($\times 10^2$) in the emission intensity, the excitation spectrum reveals the presence of a low-wavelength band with a peak around 340 nm and a shoulder at 270 nm, similarly to that already detected in the excitation of the Tb-12 and Eu-3 aerogels (FIG. 5B). The observation of such bands in the excitation spectra of $Eu^{3+}$-, $Tb^{3+}$- and $Nd^{3+}$-containing aerogels readily discard the contribution of LMCT states for the excitation spectra, as the LMCT energy depends on the lanthanide ion. Nevertheless, it is noted that the excitation component around 270 nm, is only observed at 12 K (for Eu-3 and Nd-16), being thermally quenched at 300 K, demonstrating the presence of thermally deactivated excitation mechanisms for the chlorine-free aerogels. Moreover, the component at 340 nm can be only detected for the chlorine-free aerogels clearly. Those observation unequivocally demonstrate the role of the precursor in the photoluminescence properties.

In summary, the synthesis of chlorine-free, rare earth oxide aerogels from the lanthanide series was achieved using a modified epoxide-assisted sol-gel method. An ethanolic solution of the hydrated metal nitrate, propylene oxide, and ammonium carbonate was found to gel upon heating to 80° C. Critical point drying of the wet gel in $CO_2$ yielded monolithic aerogels. Most of the aerogels were amorphous as-prepared, but became nanocrystalline after calcination at 650° C. in air. The aerogels had high surface areas (up to 150 $m^2/g$), low densities (40 $mg/cm^3$ and up), and were photoluminescent.

As used herein, the singular terms "a," "an," and "the" include plural referents unless the context clearly dictates otherwise. Thus, for example, reference to a compound can include multiple compounds unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations, which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scopes of this invention.

What is claimed is:

1. A rare earth oxide (REO) aerogel comprising a network of REO nanostructures, wherein the REO aerogel is a monolith having at least one lateral dimension of at least about 1 cm, rare earth metal content of at least about 10 atomic %, content of elements other than rare earth elements or oxygen of about 20 atomic % or less, and is substantially free of oxychloride, wherein the REO aerogel has a density of about 20-500 $mg/cm^3$.

2. The REO aerogel of claim 1, wherein the REO aerogel has at least two dimensions of at least about 1 cm.

3. The REO aerogel of claim 1, wherein the REO aerogel has at least three dimensions of at least about 1 cm.

4. The REO aerogel of claim 1, wherein the REO aerogel has a density of about 40-100 $mg/cm^3$.

5. The REO aerogel of claim 1, wherein the REO aerogel has a BET surface area of at least about 20 $m^2/g$.

6. The REO aerogel of claim 1, wherein the REO aerogel has a BET surface area of about 20-200 $m^2/g$.

7. The REO aerogel of claim 1, wherein the REO aerogel comprises at least about 20 atomic % of lanthanide.

8. The REO aerogel of claim 1, wherein the REO aerogel is a crystalline material.

9. The REO aerogel of claim 1, wherein the REO aerogel is thermally stable.

10. The REO aerogel of claim 1, wherein the REO aerogel remain monolithic after being heated for 4 hours at a temperature of about 800° C.

11. The REO aerogel of claim 1, wherein the REO aerogel is photoluminescent.

12. The REO aerogel of claim 1, wherein the REO aerogel comprises one or more of lanthanum oxide, cerium oxide, praseodymium oxide, neodymium oxide, promethium oxide, samarium oxide, europium oxide, gadolinium oxide, terbium oxide, dysprosium oxide, holmium oxide, erbium oxide, thulium oxide, ytterbium oxide, lutetium oxide, scandium oxide, or yttrium oxide.

13. The REO aerogel of claim 1, wherein the REO aerogel comprises at least two different rare earth metals or lanthanides.

14. The REO aerogel of claim 1, wherein the REO aerogel comprises at least three different rare earth metals or lanthanides.

15. The REO aerogel of claim 1, wherein the REO aerogel comprises one or more of La, Ce, Pr, Nd, Sm, Eu, Gd, Tb, Dy, Ho, Er, Tm, Yb, or Lu.

16. The REO aerogel of claim 1, wherein the REO aerogel is produced by curing a reaction mixture comprising at least one rare earth metal nitrate, at least one epoxide, at least one base catalyst, and at least one organic solvent to produce a wet gel, wherein the reaction mixture is substantially free of chloride; drying the wet gel to produce a dry gel; and thermally annealing the dry gel to produce the monolithic REO aerogel.

17. The REO aerogel of claim 1, wherein the REO aerogel is produced by curing a reaction mixture consisting essentially of at least one lanthanide nitrate, at least one epoxide, at least one base catalyst, and at least one organic solvent to produce a wet gel, wherein the reaction mixture is substantially free of chloride; drying the wet gel to produce a dry gel; and thermally annealing the dry gel to produce the monolithic REO aerogel.

18. A device comprising the REO aerogel of claim 1 as a laser material, a scintillator, a catalyst, a photo-catalyst, an ionic conductor, a magnet, a glass and ceramic colorant, and/or a solid oxide fuel cell material.

* * * * *